Nov. 5, 1929.  M. LAPHAM  1,734,681

METHOD OF INTERLOCKING BOLTS AND NUTS

Filed June 14, 1928

INVENTOR
Marshall Lapham
By J. Wm. Ellis
ATTORNEY

Patented Nov. 5, 1929

1,734,681

UNITED STATES PATENT OFFICE

MARSHALL LAPHAM, OF NEW YORK, N. Y., ASSIGNOR TO SPIRAL-ROLLED PRODUCTS CO., INC., OF NEW YORK, N. Y., A CORPORATION OF NEW YORK

METHOD OF INTERLOCKING BOLTS AND NUTS

Application filed June 14, 1928. Serial No. 285,427.

It is well known to those skilled in the art that some attempts have been made to lock a nut upon a bolt by distorting some portion of the nut. Such a method usually distorts the thread of the nut or bolt to such a degree that the lock becomes substantially permanent, or of such a nature that an attempt to remove the nut from the bolt renders the nut or bolt, or both, unfit for further use. It is absolutely necessary in the case of bolts which are used in connection with railroad rails to have the nut securely locked in place upon the bolt, but such locking means must not be permanent, since it is the general practice to periodically tighten up the nuts on such bolts, and, therefore, the locking means must be of such a nature that it will permit the nut to be turned by means of a wrench to the new position, where it can be again locked in such a manner that it will be secured in position, but not so permanently that a further adjustment of the parts will render either or both of them unfit for continued or further use.

The principal objects of my invention has been, therefore, to provide a method of interlocking bolts and nuts which shall be permanent enough to securely lock the parts together and to prevent their becoming loose, but not so permanent that when the parts are relatively rotated, as in the act of tightening the nut or removing it from the bolt, the parts shall be rendered unfit for further use.

Another object of my invention has been to provide a method of interlocking bolts and nuts which shall not require a special nut, and by which no part of the nut or bolt is distorted or mutilated except a small portion of the threads.

Moreover, the tools required in my invention are of a simple nature and may be easily carried in a workman's pocket.

Furthermore, my invention provides a method of interlocking bolts and nuts which is very simple and efficient, and one which may be easily carried out.

Figure 1:
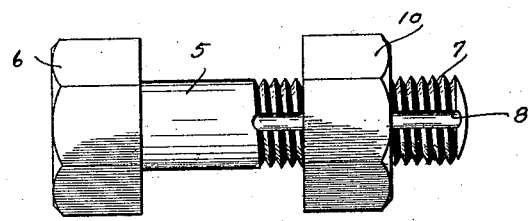
Figure 2:
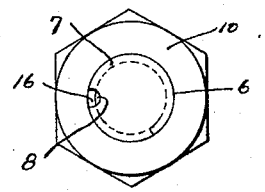
Figure 5:
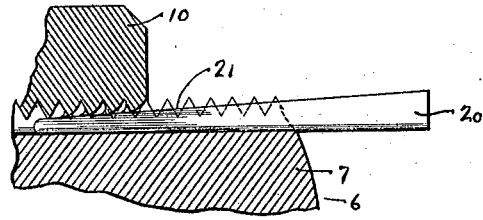
Figure 3:
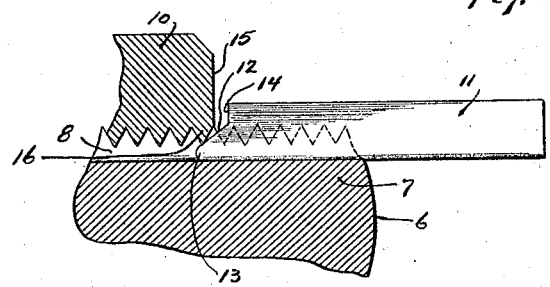
Figure 4:
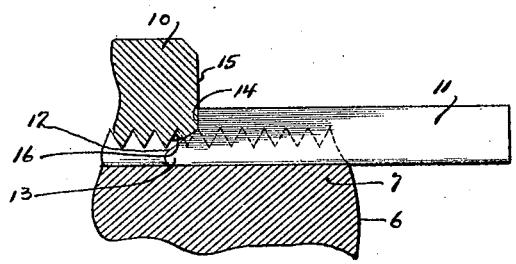

The above objects and advantages have been accomplished by the device shown in the accompanying drawings, of which:

Fig. 1 shows a front view of my invention.
Fig. 2 is an end view thereof.
Fig. 3 is an enlarged fragmentary view showing one of the steps of my invention.
Fig. 4 is a similar view showing another step of my invention.
Fig. 5 is an enlarged, fragmentary view of a differently formed punch showing one of the steps of my invention.

In the drawings, 5 represents the bolt of any design, the one shown in the drawing being provided with a hexagonal head 6. The outer end of the bolt is provided with the customary screw-threads 7. The portion of the bolt having the screw-threads is formed with a longitudinal groove 8. This groove may extend the full length of this screw-threaded portion of the bolt, or it may be shorter than this portion of the bolt by approximately the length of the nut used upon the bolt. The groove may be semi-circular on its bottom, or any other desired shape, and it is preferably of uniform depth throughout its length. The depth of the groove is such that its bottom will lie some distance below the bottom of the threads 7 of the bolt, so that there will be some space between the tops of the threads of the nut used with the bolt and the bottom of the groove.

Any standard nut 10 may be used with the bolt, the one in the drawings being a standard hexagonal nut. The bolt and the nut are standard except for the groove 8 formed in the bolt.

After the nut 10 has been drawn up into place where it is desired to lock it, a punch 11 forming part of my invention is placed within the groove 8, and its end brought against the thread of the nut which is nearest its outer face, whereupon it is struck with a hammer. In the appended claims this thread just referred to is designated at the outer nut thread. The inner end of this punch is preferably provided with an inclined surface 12, which extends rearwardly from the forward nose 13 of the punch to a shoulder 14. The shoulder is so spaced, as shown in Fig. 3, that when the inclined face 12 is in engagement with the first thread of the nut, it will contact with the outer face 15 of the nut when the punch has been forced into the groove the desired distance.

After the punch is forced into the groove the portion 16 of the first thread which lies in the groove 8 will be bent over or distorted as shown in Fig. 4, where the operation is shown completed, thus securing the nut to the bolt and preventing its rotation thereon, except upon the application of a wrench. When a wrench is applied to the nut, the distorted thread portion will be bent back into shape sufficiently to follow the thread of the bolt, since the portion of the thread of the nut lying over the groove is not distorted to a degree where it will permanently injure the thread of the nut or the threads of the bolt over which it may afterwards be forced by a relative rotation of the nut and bolt. It is obvious that the amount of distortion of the thread or threads of the nut depends upon the ductility of the metal of the nut, the force of the blow on the punch, and the width of the groove 8, it being preferable to distort only the threads of the nut.

In the form of invention of Fig. 5, a punch 20 is shown, the upper face 21 of which is but slightly inclined so that only the tops of the nut threads will be engaged and distorted. Because of the slight angle of the face 21, a number of nut threads will be engaged as shown instead of but one thread as in the form shown in Figs. 3 and 4.

When my invention is used, as hereinbefore pointed out in connection with railroad rails, the nut may be securely fastened in position any number of times that adjustment or drawing up of the parts is found necessary, because of the fact that the distortion of the nut thread portion is not sufficient to permanently injure the thread parts of either nut or bolt, but is sufficient to keep the parts securely locked together during use.

It is obvious that a nut which has been once used and removed from the bolt may be easily placed upon another or the same bolt without danger of stripping or getting the threads crossed, since the threads which first engage the nut are perfect threads and have not been subjected to distortion.

While I have shown but one groove 8 in the bolt, it is obvious that a number of grooves may be formed therein, if desired. These and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A method of interlocking bolts and nuts consisting of forming a longitudinal groove of substantially uniform depth in the threaded bolt, the bottom of the groove extending below the bottom of the bolt threads, placing a nut upon the bolt, then placing a tool in the groove, and then distorting only the top portion of at least one of the nut threads which lies in the groove by an axial movement of the tool.

2. A method of interlocking bolts and nuts consisting of forming a longitudinal groove of substantially uniform depth in the threaded bolt, the bottom of the groove extending below the bottom of the bolt threads, placing a nut upon the bolt, then placing a tool in the groove, and then distorting only those portions of the nut threads which lie in the groove and those portions of the bolt threads which are contiguous thereto.

3. A method of interlocking bolts and nuts consisting of forming a longitudinal groove of substantially uniform depth in the threaded bolt, the bottom of the groove extending below the bottom of the threads, placing a nut upon the bolt, then placing a tool within the groove of the bolt, the tool having a flat bottom surface for engagement with the bottom of the groove and with a tapered upper surface for engagement with the upper portion of the thread of the nut, and then distorting only the top portion of at least one of the nut threads which lies in the groove by an axial movement of the tool.

In testimony whereof, I have hereunto signed my name.

MARSHALL LAPHAM.